(12) United States Patent
Ikeuchi et al.

(10) Patent No.: US 9,293,930 B2
(45) Date of Patent: Mar. 22, 2016

(54) PROTECTIVE MONITORING CIRCUIT AND BATTERY PACK

(71) Applicants: Akira Ikeuchi, Tokyo (JP); Hidenori Tanaka, Tokyo (JP); Itsuki Nakano, Tokyo (JP)

(72) Inventors: Akira Ikeuchi, Tokyo (JP); Hidenori Tanaka, Tokyo (JP); Itsuki Nakano, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 14 days.

(21) Appl. No.: 14/247,343

(22) Filed: Apr. 8, 2014

(65) Prior Publication Data

US 2014/0217990 A1    Aug. 7, 2014

Related U.S. Application Data

(62) Division of application No. 13/579,317, filed as application No. PCT/JP2011/053128 on Feb. 15, 2011, now Pat. No. 8,773,830.

(30) Foreign Application Priority Data

Feb. 22, 2010   (JP) ................................. 2010-036671

(51) Int. Cl.
*H02J 7/00*          (2006.01)
*H01M 10/48*         (2006.01)
(Continued)

(52) U.S. Cl.
CPC ............. *H02J 7/0029* (2013.01); *H01M 10/48* (2013.01); *H02H 7/18* (2013.01); *H02J 7/0031* (2013.01);
(Continued)

(58) Field of Classification Search
CPC ............ H02J 7/0029; H02J 2007/0037; H02J 2007/0039; H02J 2007/004

USPC .......................................................... 361/86
See application file for complete search history.

(56) References Cited

U.S. PATENT DOCUMENTS 6,137,265 A   10/2000   Cummings et al.
6,265,848 B1   7/2001   Mukainakano
(Continued)

FOREIGN PATENT DOCUMENTS

CN         1233083      10/1999
JP       2000-014027     1/2000
(Continued)

OTHER PUBLICATIONS

Japanese Office Action mailed May 7, 2014.
(Continued)

*Primary Examiner* — Scott Bauer
(74) *Attorney, Agent, or Firm* — IPUSA, PLLC (57) ABSTRACT

A protective monitoring circuit includes a protective circuit to detect at least one of overcharging, overdischarging, and overcurrent of a chargeable secondary battery to control whether to turn on or off a control transistor to protect the secondary battery, and a secondary-battery monitoring circuit, having a reduced size and having a breakdown voltage lower than a battery voltage of the secondary battery, to detect a status of the secondary battery, wherein the protective circuit generates a voltage that is commensurate with an output voltage of the secondary battery and that is within a predetermined tolerance voltage range of the secondary-battery monitoring circuit, and the secondary-battery monitoring circuit generates a detection value responsive to the generated voltage supplied from the protective circuit, the detection value being indicative of the output voltage of the secondary battery.

6 Claims, 6 Drawing Sheets

(51) Int. Cl.
*H02H 7/18* (2006.01)
*H01M 10/052* (2010.01)

(52) U.S. Cl.
CPC ........ *H01M 10/052* (2013.01); *H02J 2007/004* (2013.01); *H02J 2007/0037* (2013.01); *H02J 2007/0039* (2013.01)

(56) References Cited

U.S. PATENT DOCUMENTS

| | | | |
|---|---|---|---|
| 6,340,889 | B1 | 1/2002 | Sakurai |
| 6,670,790 | B2 | 12/2003 | Stellberger |
| 7,948,212 | B2 | 5/2011 | Odaohhara |
| 8,174,237 | B2 | 5/2012 | Kosugi et al. |
| 2005/0242779 | A1 | 11/2005 | Yoshio |
| 2008/0024089 | A1 | 1/2008 | Meng et al. |
| 2009/0058370 | A1* | 3/2009 | Odaohhara .......... 320/152 |
| 2009/0153103 | A1 | 6/2009 | Ikeuchi et al. |
| 2010/0289497 | A1* | 11/2010 | Lum-Shue-Chan et al. .. 324/426 |

FOREIGN PATENT DOCUMENTS

| | | |
|---|---|---|
| JP | 2000-295776 | 10/2000 |
| JP | 2005-160169 | 6/2005 |
| JP | 2009-153238 | 7/2009 |

OTHER PUBLICATIONS

Chinese Office Action mailed Mar. 27, 2014.
International Search Report mailed on May 24, 2011.

* cited by examiner

PROTECTIVE MONITORING CIRCUIT AND BATTERY PACK

CROSS-REFERENCE TO RELATED APPLICATIONS

This application is a divisional of and claims the benefit of U.S. patent application Ser. No. 13/579,317 filed on Aug. 16, 2012, which is a National Phase Application under 35 U.S.C. 371 of PCT/JP2011/053128 filed on Feb. 15, 2011, which is based on and claims the benefit of priority from the Japanese Patent Application No. 2010-036671 filed on Feb. 22, 2010, with the Japan Patent Office, the entire contents of which are hereby incorporated by reference.

TECHNICAL FIELD

The disclosures herein relate to a protective monitoring circuit and a battery pack provided with the protective monitoring circuit.

BACKGROUND ART

In recent years, lithium ion batteries have been used as chargeable secondary batteries in portable apparatuses such as digital cameras and portable phones. A lithium ion battery is generally susceptible to overcharging, overcurrent, and overdischarging, and is thus used in a battery pack having a protective circuit to protect the lithium ion battery by detecting overcharging, overcurrent, and overdischarging. Such a battery pack may be provided with a secondary battery monitoring circuit that detects the status of a lithium ion battery such as a remaining battery level.

There is a battery pack provided with a secondary battery monitoring circuit to which the voltage of a secondary battery is directly applied for detection of the voltage of the secondary battery (Patent Document 1, for example).

RELATED-ART DOCUMENTS

Patent Document

[Patent Document 1] Japanese Patent Application Publication No. 2009-153238

SUMMARY OF THE INVENTION

Problem to be Solved by the Invention

In the battery pack described above, however, size reduction of the secondary battery monitoring circuit for the purpose of reducing the chip size results in the tolerable input voltage of the secondary battery monitoring circuit being lowered due to a drop of breakdown voltage caused by the size reduction. In such a case, the voltage of the secondary battery may not be suitable as a direct input into the secondary battery monitoring circuit.

The secondary battery circuit includes a voltage sensor for detecting the voltage of the secondary battery. There may be a case in which electro-static discharge (ESD) is applied to the secondary battery monitoring circuit from an external terminal through a path connected to the external terminal for connection with a portable device or the like. In such a case, the problem is that it is difficult to improve the resistance to static electricity at the voltage sensor of the secondary battery circuit.

Accordingly, it is desirable to provide a protective monitoring circuit in which a secondary battery monitoring circuit having a lowered breakdown voltage due to size reduction of the circuit can detect the output voltage of a secondary battery, and in which the resistance to static electricity is improved. It is also desirable to provide a battery pack provided with such a protective monitoring circuit.

Means to Solve the Problem

According to one embodiment, a protective monitoring circuit includes a protective circuit to detect at least one of overcharging, overdischarging, and overcurrent of a chargeable secondary battery to control whether to turn on or off a control transistor to protect the secondary battery, and a secondary-battery monitoring circuit, having a reduced size and having a breakdown voltage lower than a battery voltage of the secondary battery, to detect a status of the secondary battery, wherein the protective circuit generates a voltage that is commensurate with an output voltage of the secondary battery and that is within a predetermined tolerance voltage range of the secondary-battery monitoring circuit, and the secondary-battery monitoring circuit generates a detection value responsive to the generated voltage supplied from the protective circuit, the detection value being indicative of the output voltage of the secondary battery.

According to one embodiment, a battery pack includes a secondary battery, and a protective monitoring circuit, wherein the protective monitoring circuit includes a protective circuit to detect at least one of overcharging, overdischarging, and overcurrent of a chargeable secondary battery to control whether to turn on or off a control transistor to protect the secondary battery, and a secondary-battery monitoring circuit, having a reduced size and having a breakdown voltage lower than a battery voltage of the secondary battery, to detect a status of the secondary battery, wherein the protective circuit generates a voltage that is commensurate with an output voltage of the secondary battery and that is within a predetermined tolerance voltage range of the secondary-battery monitoring circuit, and the secondary-battery monitoring circuit generates a detection value responsive to the generated voltage supplied from the protective circuit, the detection value being indicative of the output voltage of the secondary battery.

Advantage of the Invention

According to at least one embodiment, provision is made such that a secondary battery monitoring circuit having a lowered breakdown voltage due to size reduction of the circuit can detect the output voltage of a secondary battery. Also, the resistance to static electricity is improved.

MODE FOR CARRYING OUT THE INVENTION

In the following, embodiments for carrying out the technology disclosed herein will be described. Prior to that, a description will be given of the circuit diagram of a related-art battery pack for the purpose of delineating embodiments in contrast with the related-art technology.

<Circuit Diagram of Related-Art Battery Pack>

Figure 1:
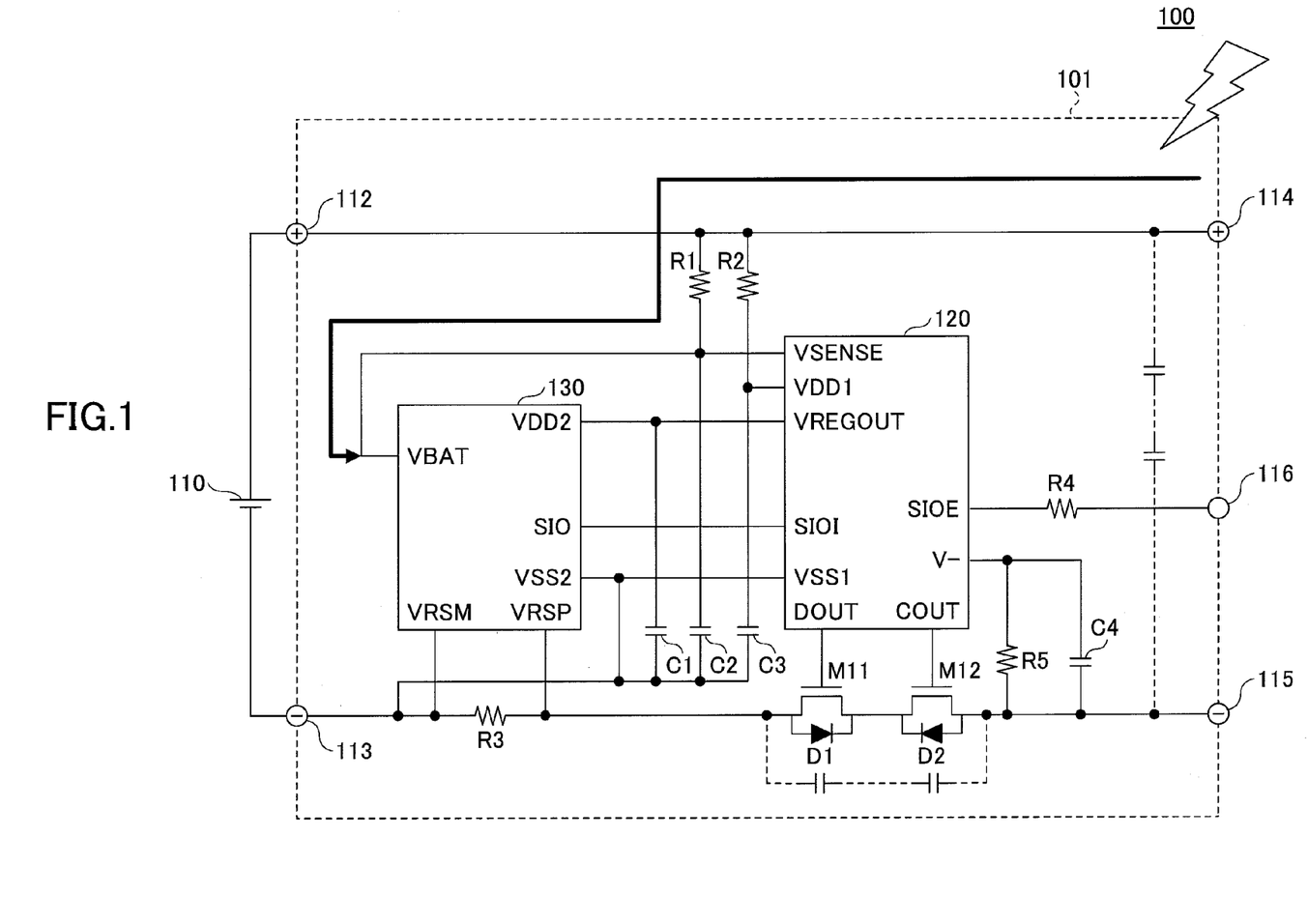
FIG. 1 is a drawing illustrating an example of the circuit diagram of a related-art battery pack.

FIG. 1 is a drawing illustrating an example of the circuit diagram of a related-art battery pack. As illustrated in FIG. 1, a battery pack 100 includes a protective monitoring circuit 101, a chargeable secondary battery 110 such as a lithium ion battery, a secondary-battery-contact positive-electrode terminal 112, a secondary-battery-contact negative-electrode terminal 113, and a positive-electrode terminal 114 as well as a negative-electrode terminal 115 serving as external terminals.

The battery pack 100 is used upon being connected to a portable device, a charging device, or the like through the positive-electrode terminal 114 and the negative-electrode terminal 115. The protective monitoring circuit 101 and the secondary battery 110 are connected to each other through the secondary-battery-contact positive-electrode terminal 112 and the secondary-battery-contact negative-electrode terminal 113.

The protective monitoring circuit 101 is configured to include a protective IC (integrated circuit) 120 and a secondary-battery monitoring IC 130. Further, the protective monitoring circuit 101 includes resistors R1 through R5, condensers C1 through C4, a MOS (metal oxide semiconductor) transistor M11 having a parasitic diode D1, a MOS transistor M12 having a parasitic diode D2, the positive-electrode terminal 114, the negative-electrode terminal 115, and an external terminal 116. The protective monitoring circuit 101 is implemented as a protective module or as a COB (i.e., Chip on Board) by arranging the above-noted constituent elements on a single substrate.

The protective IC 120 includes an overcharging detecting circuit, an overdischarging detecting circuit, and an overcurrent detecting circuit to detect overcharging, overdischarging, and overcurrent of the secondary battery 110, respectively, thereby controlling whether to turn on or off the control transistors situated between a portable device or charging device and the secondary battery 110.

Further, the protective IC 120 includes a power supply terminal VDD1, a reference potential terminal VSS1, a power supply voltage supplying terminal VREGOUT, a voltage sensing terminal VSENSE, communication terminals SIOI and SIOE, a terminal V-connected to the negative-electrode terminal 115, a terminal DOUT, and a terminal COUT.

As illustrated in FIG. 1, the protective IC 120 receives a power supply voltage at VDD1 that is connected to the positive electrode of the secondary battery 110. The protective IC 120 regulates the supplied power supply voltage, and supplies the regulated power supply voltage from VREGOUT to VDD2 of the secondary-battery monitoring IC 130, thereby supplying a power supply voltage to the secondary-battery monitoring IC 130.

Further, the protective IC 120 detects the voltage of the secondary battery 110 at VSENSE that is connected to the positive electrode of the secondary battery 110, thereby detecting overcharging, overdischarging, etc. The protective IC 120 outputs control signals for controlling the MOS transistors M11 and M12 from the terminals DOUT and COUT, respectively, which are connected to the gates of the MOS transistors M11 and M12, respectively, for discontinuing charging and discharging of the battery pack 100.

Upon detecting overdischarging or discharge overcurrent, for example, the protective IC 120 sets the output of the terminal DOUT to the LOW level to turn off the MOS transistor M11. Upon detecting overcharging or charge overcurrent, the protective IC 120 sets the output of the terminal COUT to the LOW level to turn off the MOS transistor M12.

Moreover, the protective IC 120 allows communication information between the secondary-battery monitoring IC 130 and the portable device or the like to pass through the SIOI and SIOE connected to the external terminal 116 for communicating with the portable device or the like.

On the other hand, the secondary-battery monitoring IC 130 detects the output voltage and the like of the secondary battery 110 to detect the status of the secondary battery 110 such as a remaining battery level. The secondary-battery monitoring IC 130 is configured such that the secondary-battery monitoring IC 130 has the power supply terminal VDD2, a voltage sensing terminal VBAT, a reference potential terminal VSS2, a pair of voltage detecting terminals VRSP and VRSM, and a communication terminal SIO.

As illustrated in FIG. 1, the secondary-battery monitoring IC 130 receives a power supply voltage at VDD2 that is connected to VREGOUT of the protective IC 120. Further, the secondary-battery monitoring IC 130 detects a voltage across the resistor R3 situated outside the secondary-battery monitoring IC 130 by use of the voltage detecting terminals VRSM and VRSP to detect the electric current flowing through the resister R3, thereby detecting the charge and discharge current of the secondary battery 110. Moreover, the secondary-battery monitoring IC 130 communicates with the portable device or the like through the SIO that is connected through the protective IC 120 to the external terminal 116 attached to the portable device or the like.

The secondary-battery monitoring IC 130 directly receives and senses the output voltage of the secondary battery 110 at VBAT that is connected through the resistor R1 to the positive electrode of the secondary battery 110. In this state, the secondary-battery monitoring IC 130 is connected to the positive-electrode terminal 114 through the resistor R1. Because of this, electrostatic discharge (ESD) propagates through the path illustrated by an arrow in FIG. 1 to reach the secondary-battery monitoring IC 130, which imposes restrictions on the improvement of resistance to static electricity.

<Block Diagram of Related-Art Configuration for Detecting Output Voltage of Secondary Battery>

Figure 2:
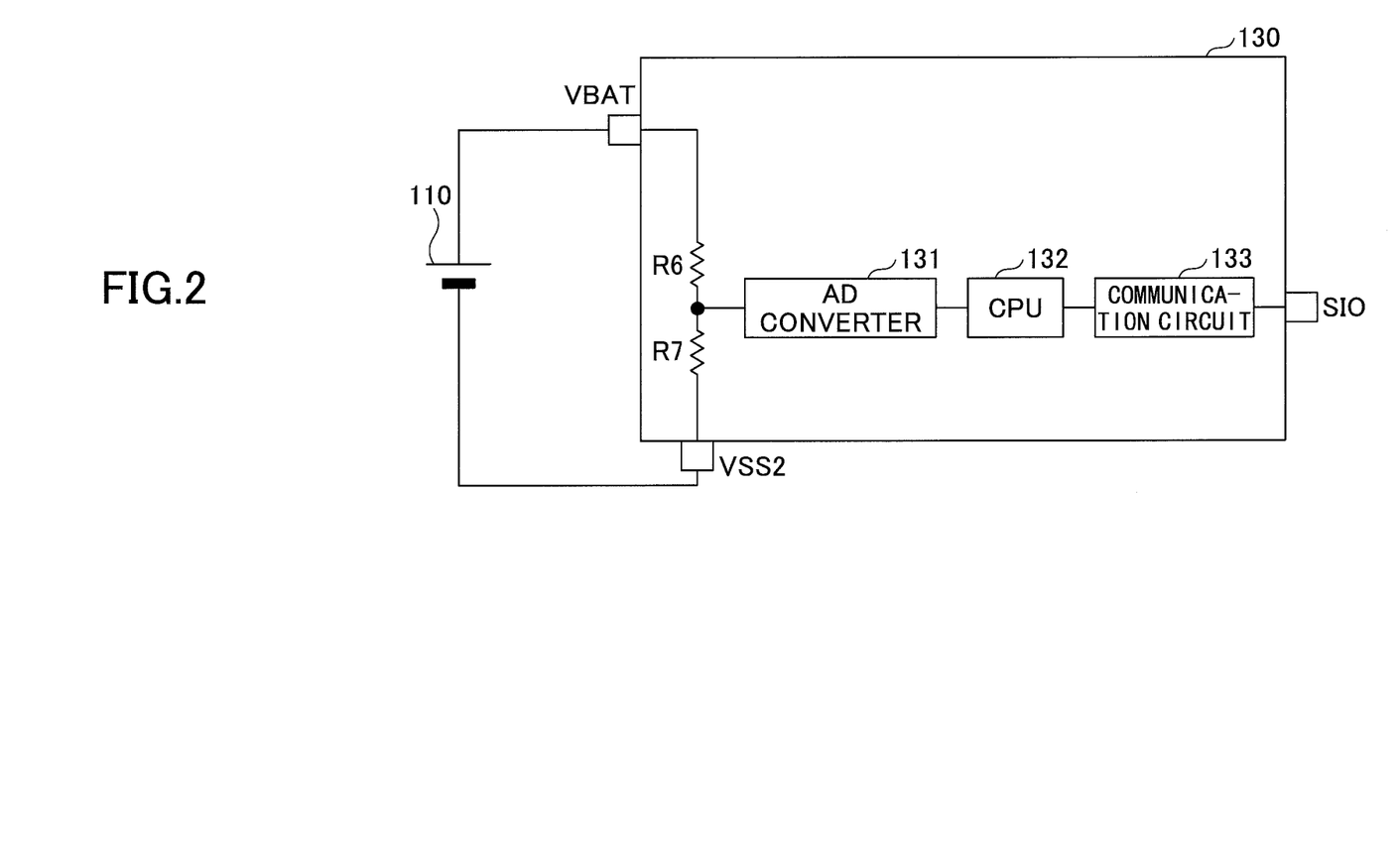
FIG. 2 is a block diagram of a related-art configuration for detecting the output voltage of a secondary battery.

In the following, a description will be given of a block diagram of a related-art configuration for detecting the output voltage of a secondary battery with reference to FIG. 2. FIG. 2 is a block diagram of a related-art configuration for detecting the output voltage of a secondary battery.

As illustrated in FIG. 2, the secondary-battery monitoring IC 130 includes an AD converter 131, a CPU (central processing unit) 132, and a communication circuit 133. Further, the secondary-battery monitoring IC 130 includes the voltage sensing terminal VBAT connected to the positive electrode of the secondary battery 110, the reference potential terminal VSS2 connected to the negative electrode of the secondary battery 110, and the communication terminal SIO.

The secondary-battery monitoring IC 130 also includes divider resistors R6 and R7 connected in series between VBAT and VSS2. A voltage obtained by dividing the output voltage of the secondary battery 110 is supplied from the connection point between the resistor R6 and the resistor R7 to the AD converter 131. The supplied divided voltage is input into the AD converter 131 and AD-converted for provision to the CPU 132.

The CPU 132 detects the battery voltage of the secondary battery 110 based on the digital value supplied thereto. Information indicative of the battery voltage of the secondary battery 110 detected by the CPU 132 is supplied to the portable device or the like through the communication circuit 133 and the communication terminal SIO.

As described above, when the secondary-battery monitoring IC 130 is reduced in size for the purpose of achieving chip size reduction, the tolerable voltage of the secondary-battery monitoring IC 130 is lowered due to the size reduction. As a result, the voltage level applicable to the secondary-battery monitoring IC 130 is lowered, resulting in the problem that the battery voltage of the secondary battery 110 cannot be directly input into the secondary-battery monitoring IC 130.

In embodiments described below, a protective circuit generates a secondary-battery commensurate voltage that is commensurate with the output voltage of the secondary battery and kept within the range of tolerable voltages. The secondary-battery monitoring circuit uses the secondary-battery commensurate voltage obtained from the protective circuit to detect the output voltage of the secondary battery. Namely, the protective circuit generates a secondary-battery commensurate voltage that is commensurate with the output voltage of the secondary battery and kept within the range of tolerable input voltages of the secondary-battery monitoring circuit, and the secondary-battery monitoring circuit generates a detection value responsive to this generated voltage supplied from the protective circuit. This detection value indicates the output voltage of the secondary battery. With this arrangement, the secondary-battery monitoring circuit that is reduced in size and has a breakdown voltage lower than the battery voltage of the secondary battery can detect the output voltage of the secondary battery despite the lowered breakdown voltage resulting from the circuit size reduction.

In the following, the present embodiment will be described in detail by referring to drawings.

<Circuit Diagram of Battery Pack of Present Embodiment>

Figure 3:
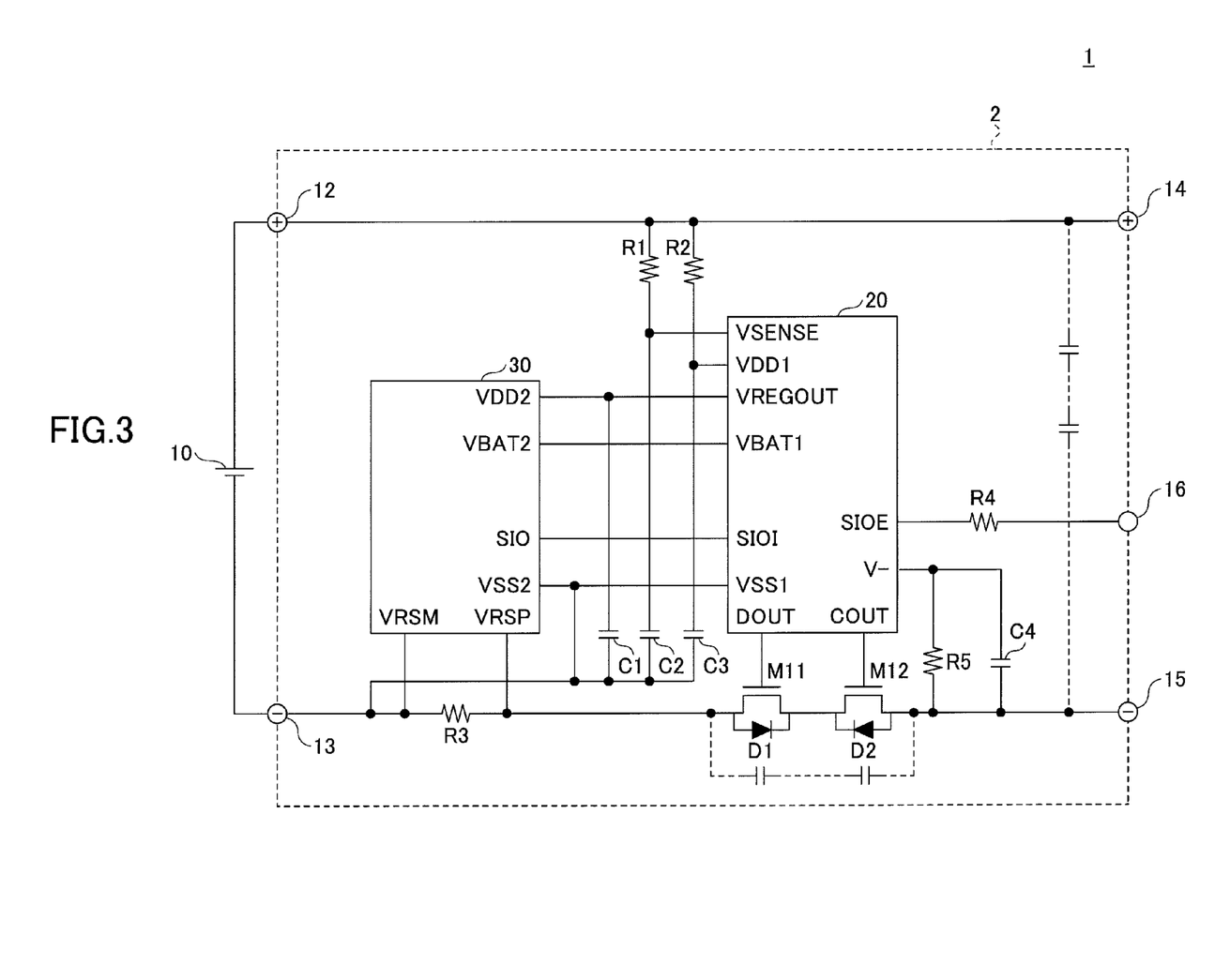
FIG. 3 is a drawing illustrating an example of the circuit diagram of a battery pack provided with a protective monitoring circuit according to a present embodiment.

FIG. 3 is a drawing illustrating an example of the circuit diagram of a battery pack according to the present embodiment. The difference from the circuit diagram of the related-art battery pack illustrated in FIG. 1 is that, in place of VBAT of the secondary-battery monitoring IC 130 that is connected to the resistor R1, VBAT1 is provided on a protective IC 20 illustrated in FIG. 3, and VBAT2 connected to VBAT1 is provided on a secondary-battery monitoring IC 30.

The same elements as those shown in FIG. 1 are referred to by the same symbols, and a description thereof will be omitted. The secondary battery 110 of FIG. 1 corresponds to a secondary battery 10 of FIG. 3. The terminals 112 through 116 of FIG. 1 correspond to terminals 12 through 16 of FIG. 3, respectively.

As illustrated in FIG. 3, a protective monitoring circuit 2 includes the protective IC (integrated circuit) 20 serving as a protective circuit and the secondary-battery monitoring IC 30 serving as a secondary-battery monitoring circuit.

<Protective IC 20>

In the following, a description will be given of the protective IC 20 illustrated in FIG. 3. The protective IC 20 includes an overcharging detecting circuit, an overdischarging detecting circuit, and an overcurrent detecting circuit to detect overcharging, overdischarging, and overcurrent of the secondary battery 10 such as a lithium ion battery, respectively, thereby controlling whether to turn on or off the control transistors situated between the secondary battery 10 and a portable device or a charging device that supplies power to the secondary battery. With this arrangement, the protective IC 20 protects the secondary battery 10 from overcharging, overcurrent, overdischarging, etc.

As illustrated in FIG. 3, the protective IC 20 is configured to have the terminal VBAT1 that is connected to VBAT2 of the secondary-battery monitoring IC 30.

The protective IC 20 includes a voltage divider circuit 23 connected to VSENSE as will be described later, by which to divide the battery voltage of the secondary battery 10 applied to VSENSE. Further, the protective IC 20 supplies a secondary-battery commensurate voltage obtained by dividing the battery voltage of the secondary battery 10 from VBAT1 to VBAT2 of the secondary-battery monitoring IC 30. With this arrangement, the protective IC 20 generates the secondary-battery commensurate voltage that is commensurate with the output voltage of the secondary battery 10 and that is kept within the predetermined tolerance voltage range of the secondary-battery monitoring IC 30.

<Secondary-Battery Monitoring IC 30>

In the following, a description will be given of the secondary-battery monitoring IC 30 illustrated in FIG. 3. The secondary-battery monitoring IC 30 is reduced in size, so that its breakdown voltage is lower than the battery voltage of the secondary battery 10. Further, the secondary-battery monitoring IC 30 includes a circuit for detecting the status of the secondary battery 10 such as a remaining battery level.

Upon receiving from a portable device or the like a request to check status information such as the remaining battery level of the secondary battery 10, the secondary-battery monitoring IC 30 supplies the status information responsive to the check request to the portable device or the like.

The secondary-battery monitoring IC 30 is configured to have the voltage sensing terminal VBAT2 that is connected to VBAT1 of the protective IC 20.

The secondary-battery monitoring IC 30 receives at VBAT2 the secondary-battery commensurate voltage that is commensurate with the output voltage of the secondary battery 10 and that is generated by the protective IC 20 to be within the predetermined tolerance voltage range of the secondary-battery monitoring IC 30, thereby detecting the voltage of the secondary battery 10. The method of detecting the voltage of the secondary battery 10 performed by the secondary-battery monitoring IC 30 will be described later.

<Block Diagram of Configuration of Present Embodiment for Detecting Output Voltage of Secondary Battery>

Figure 4:
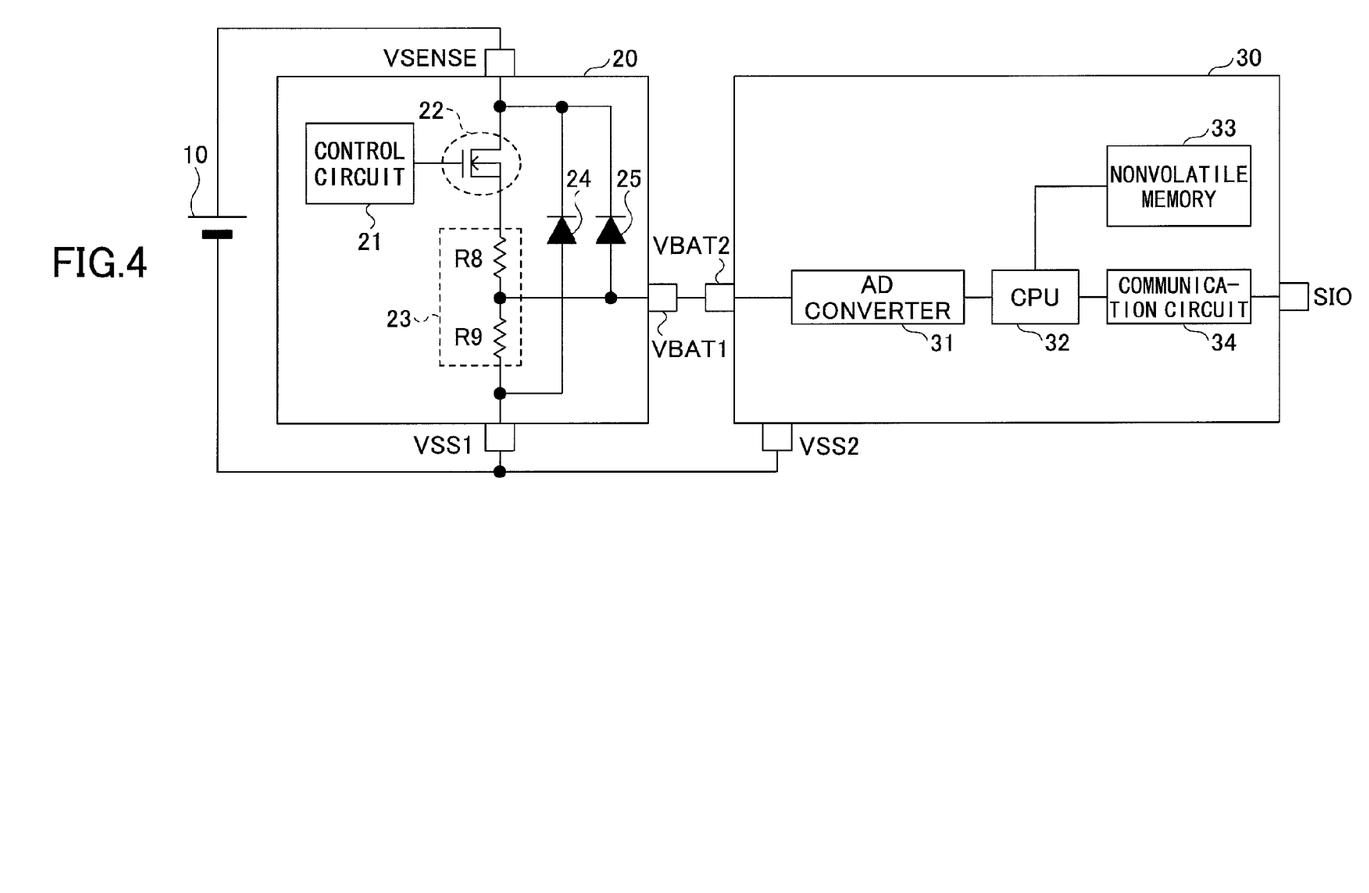
FIG. 4 is a block diagram of the configuration of the present embodiment for detecting the output voltage of a secondary battery.

In the following, a description will be given of a block diagram of the configuration of the present embodiment for detecting the output voltage of a secondary battery with reference to FIG. 4. FIG. 4 is a block diagram of the configuration of the present embodiment for detecting the output voltage of a secondary battery.

As illustrated in FIG. 4, the protective IC 20 includes a control circuit 21, a switching device 22, a voltage divider circuit 23, and protective diodes 24 and 25. Further, the protective IC 20 includes VSENSE connected to the positive electrode of the secondary battery 10, VSS1 connected to the negative electrode of the secondary battery 10, and VBAT1 connected to VBAT2 of the secondary-battery monitoring IC 30.

The secondary-battery monitoring IC 30 includes an AD converter 31, a CPU 32, a nonvolatile memory 33, a communication circuit 34, VBAT2 connected to VBAT1 of the protective IC 20, VSS2 connected to the negative electrode of the secondary battery 10, and a communication terminal SIO.

The protective IC 20 uses the voltage divider circuit 23 to divide the output voltage of the secondary battery 10 that is applied to VSENSE. The voltage divider circuit 23 is comprised of divider resistors R8 and R9. The divider resistors R8 and R9 are connected in series between VSENSE and VSS1.

In the protective IC 20, the output voltage of the secondary battery 10 applied to VSENSE is divided by the divider resistors R8 and R9, so that a secondary-battery commensurate voltage commensurate with the output voltage of the secondary battery 10 and kept within the predetermined tolerance voltage range of the secondary-battery monitoring IC 30 is supplied from the connection point between the divider resistor R8 and the divider resistor R9 to the secondary-battery monitoring IC 30.

The second-battery commensurate voltage, which is obtained by division at the connection point between the divider resistor R8 and the divider resistor R9, and is commensurate with the output voltage of the secondary battery 10, is supplied from VBAT1 of the protective IC 20 to VBAT2 of secondary-battery monitoring IC 30.

As further illustrated in FIG. 4, the protective IC 20 is provided with the switching device 22 situated between VSENSE and the voltage divider circuit 23. The control circuit 21 controls the gate voltage of the control transistor constituting the switching device 32, and turns on the switching device 32 when measuring the voltage of the secondary battery 10.

Upon the switching device 32 being turned on, the secondary-battery commensurate voltage commensurate with the output voltage of the secondary battery 10 obtained by division by the voltage divider circuit 23 is supplied to the secondary-battery monitoring IC 30. The control circuit 21 turns off the switch when not measuring the voltage of the secondary battery 10, thereby reducing the consumption of electric current.

Upon receiving at VBAT2 the secondary-battery commensurate voltage commensurate with the output voltage of the secondary battery 10, the secondary-battery monitoring IC 30 converts the secondary-battery commensurate voltage into a digital value by use of the AD converter 31 for provision to the CPU 32. The CPU 32 detects the battery voltage of the secondary battery 10 based on the provided digital value of the secondary-battery commensurate voltage. Information indicative of the battery voltage of the secondary battery 10 detected by the CPU 32 is supplied to the portable device or the like through the communication circuit 34 and the communication terminal SIO.

As described above, the secondary-battery monitoring IC 30 receives, from the protective IC 20, the secondary-battery commensurate voltage that is commensurate with the output voltage of the secondary battery 10 and that is within the predetermined tolerance voltage range of the secondary-battery monitoring IC 30, thereby being able to detect the voltage of the secondary battery 10.

<Output of AD Converter>

Figure 5:
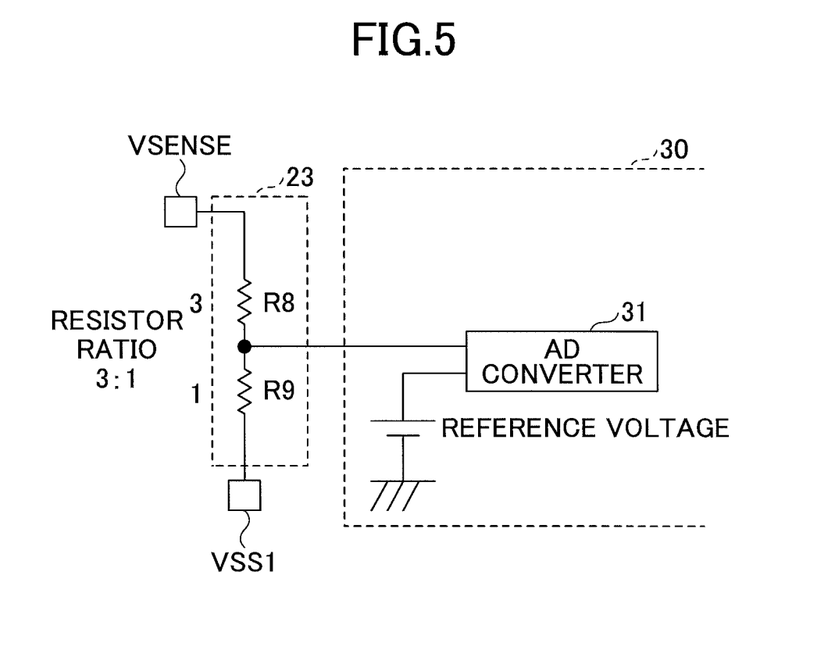
FIG. 5 is a drawing for explaining the output of the AD converter of the secondary-battery monitoring IC.

In the following, a description will be given of the output of the AD converter 31 of the secondary-battery monitoring IC 30. FIG. 5 is a drawing for explaining the output of the AD converter of the secondary-battery monitoring IC.

As illustrated in FIG. 5, the protective IC 20 may be configured such that a resistor ratio of the divider resistor R8 to the divider resistor R9 in the voltage divider circuit 23 is set to 3:1. In this case, the output voltage of the secondary battery 10 is divided by 4 by the voltage divider circuit 23, and ¼ of the output voltage of the secondary battery 10 (i.e., the secondary-battery commensurate voltage) is supplied to the AD converter 31 of the secondary-battery monitoring IC 30.

The AD converter 31 compares ¼ of the output voltage of the secondary battery 10 (i.e., the secondary-battery commensurate voltage) with an internal reference voltage to output a differential obtained by the comparison as a digital value. The value of the reference voltage may be 800 mV. The input range of the AD converter 31 may be 800±512 mV (i.e., 288 to 1312 mV).

<Method of Detecting Secondary-Battery Commensurate Voltage at Secondary-Battery Monitoring IC 30>

Figure 6:
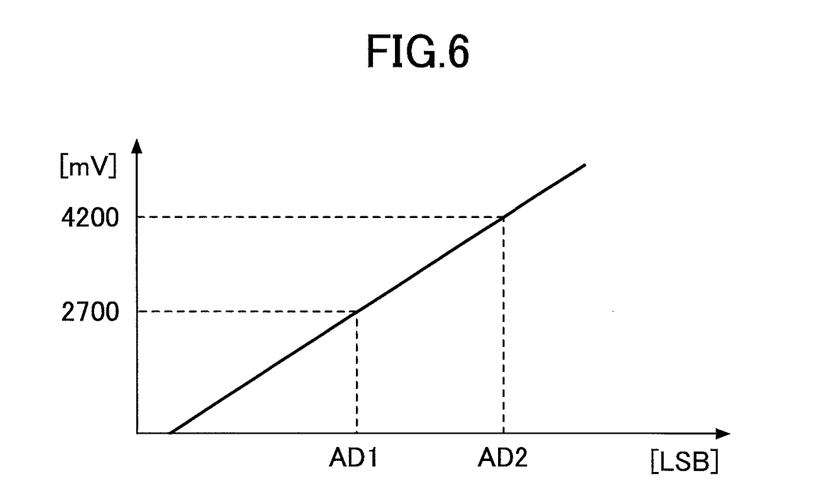
FIG. 6 is a drawing for explaining the correction method used by the secondary-battery monitoring IC in detecting the secondary-battery commensurate voltage.

In the following, a description will be given of a correction method used by the secondary-battery monitoring IC 30 in detecting the secondary-battery commensurate voltage. FIG. 6 is a drawing for explaining the correction method used by the secondary-battery monitoring IC in detecting the secondary-battery commensurate voltage.

As was previously described, the secondary-battery monitoring IC 30 uses the secondary-battery commensurate voltage commensurate with the output voltage of the secondary battery obtained from the protective IC 20 to detect the output voltage of the secondary battery 10. In this arrangement, the protective IC 20 is provided with the voltage divider circuit 23 including a plurality of resistors.

Resistance values may vary in response to temperature changes, product variation of resistance values actually used, and so on, resulting in variation or fluctuation of a divided value.

In order to accurately measure the output voltage of the secondary battery 10, the secondary-battery monitoring IC 30 calculates in advance the gain and offset factors of the output voltage of the secondary battery that is in linear relationship with the secondary-battery commensurate voltage. Using the obtained gain and offset factors, the secondary-battery monitoring IC 30 detects the output voltage of the secondary battery based on the secondary-battery commensurate voltage.

For example, an input voltage 1 (e.g., 2700 mV) and an input voltage 2 (e.g., 4200 mV) are applied to VSENSE of the protective IC 20 as calibration-purpose input voltages, for example. In this case, with AD1 and AD2 being obtained as results of AD conversions by the AD converter 31, the CPU 32 of the secondary-battery monitoring IC 30 obtains correction factors, i.e., gain G and offset F, by use of the input voltages 1 and 2 and the AD conversion results AD1 and AD2.

As illustrated in FIG. 6, the AD conversion result AD1 is obtained upon applying 2700 mV as the input voltage 1, and the AD conversion result AD2 is obtained upon applying 4200 mV as the input voltage 2. In this case, gain G (i.e. the slope of the straight line) and offset F (i.e., the intercept between the y axis and the straight line) are obtained as follows.

$$\text{gain } G = (4200 - 2700)/(AD2 - AD1)$$

$$\text{offset } F = -\text{gain } G \times AD1 + 2700$$

The CPU 32 obtains gain G and offset F in advance as described above, and stores the obtained values in the nonvolatile memory 33 or the like. Upon receiving a secondary-battery commensurate voltage commensurate with the output voltage of the secondary battery 10 from the protective IC 20, the CPU 32 performs the following arithmetic operation with respect to the digital value (e.g., AD conversion result N) obtained by the AD converter 31 by use of the correction values, i.e., gain G and offset F, thereby calculating the output voltage (e.g., input voltage N) of the secondary battery 10.

input voltage $N = AD$ conversion result $N \times$ gain $G +$ offset $F$

With this arrangement, the secondary-battery monitoring IC 30 can accurately detect the output voltage of the secondary battery 10 based on the secondary-battery commensurate voltage obtained from the protective IC 20 by correcting variations of the resistance values of the protective IC 20 even if such variations exist.

<Examples of Battery Pack Provided with Protective Monitoring Circuit and Portable Device Provided with Such a Battery Pack>

Figure 7:
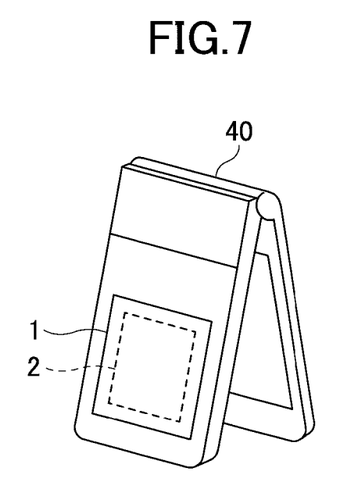
FIG. 7 is a drawing illustrating an example of a battery pack provided with a protective monitoring circuit of the present embodiment and a portable device provided with such a battery pack.

In the following, a description will be given of a battery pack 1 provided with a protective monitoring circuit 2 of the present embodiment and a portable device 40 provided with the battery pack 1 by referring to FIG. 7. FIG. 7 is a drawing illustrating an example of a battery pack provided with a protective monitoring circuit of the present embodiment and a portable device provided with such a battery pack.

As illustrated in FIG. 7, the protective monitoring circuit 2 of the present embodiment is situated in the battery pack 1. The battery pack 1 provided with the protective monitoring circuit 2 is attached to the portable device 40, for example, when used.

According to the present embodiment described above, provision is made such that a secondary battery monitoring circuit having a lowered breakdown voltage due to size reduction of the circuit can detect the output voltage of a secondary battery, and, also, the resistance to static electricity is improved.

It may be noted that the substrate on which the protective IC 20 and the secondary-battery monitoring IC 30 are arranged may be warped due to one reason or another. In such a case, the larger the chip size, the larger the effect of the substrate warping is. Further, the stress applied to the chip increases toward the end of the chip.

When the chip size of the protective IC 20 is compared with the chip size of the secondary-battery monitoring IC 30, the chip size of the secondary-battery monitoring IC 30 is larger. Upon the occurrence of the substrate warping, thus, the secondary-battery monitoring IC 30 is more susceptible to the effect of the substrate warping.

If the voltage divider circuit was implemented within the secondary-battery monitoring IC 30, it would be difficult to place the voltage divider circuit, which was an analog block, at the center because the CPU, the memory, and the logic block were larger than this analog block. Because of this, the voltage divider circuit would have to be placed near an end of the chip where the effect of the stress was relatively large. On the other hand, the protective IC 20 does not have a large-scale block, so that it is relatively easy to place the voltage divider circuit at the center of the chip.

With the configuration in which the voltage divider circuit is thus implemented in the protective IC 20, the effect of the substrate warping and the effect of chip stress on the voltage divider circuit can be suppressed to a minimum.

It may be noted that the configuration in which the secondary-battery monitoring IC 30 receives power not directly from the secondary battery 10 but through the protective IC 20 can further reduce the effect of electrostatic discharge arriving from outside.

Although the invention has been described by referring to embodiments, the invention is not limited to the configurations of these embodiments. Various variations and modifications may be made without departing from the scope of the present invention, and may be made in accordance with applications.

DESCRIPTION OF REFERENCE SYMBOLS

1, 100 battery pack
2, 101 protective monitoring circuit
12, 112 secondary-battery-contact positive-electrode terminal
13, 113 secondary-battery negative-electrode terminal
14, 114 positive-electrode terminal
15, 115 negative-electrode terminal
16, 116 external terminal
20, 120 protective IC
21 control circuit
22 switching device
23 voltage divider circuit
24, 25 protective diode
30, 130 secondary-battery monitoring IC
31, 131 AD converter
32, 132 CPU
33 nonvolatile memory
34, 133 communication circuit
40 portable device

The invention claimed is:

1. A protective monitoring circuit, comprising:
    a protective circuit to detect at least one of overcharging, overdischarging, and overcurrent of a chargeable secondary battery to control whether to turn on or off a control transistor to protect the secondary battery; and
    a secondary-battery monitoring circuit to detect a status of the secondary battery,
    wherein the protective circuit generates a voltage that is commensurate with an output voltage of the secondary battery and that is within a predetermined tolerance voltage range of the secondary-battery monitoring circuit, and the secondary-battery monitoring circuit generates a detection value responsive to the generated voltage supplied from the protective circuit, the detection value being indicative of the output voltage of the secondary battery, and
    wherein the voltage generated by the protective circuit and supplied to the secondary-battery monitoring circuit is an electrical voltage commensurate with and lower than the output voltage of the secondary battery.

2. The protective monitoring circuit as claimed in claim 1, wherein the protective circuit includes a voltage terminal to receive the output voltage of the secondary battery and an output terminal to output the generated voltage commensurate with the output voltage of the secondary battery.

3. The protective monitoring circuit as claimed in claim 2, wherein the protective circuit includes a voltage divider circuit connected to the voltage terminal.

4. The protective monitoring circuit as claimed in claim 3, wherein the protective circuit has a switching device situated between the voltage terminal and the voltage divider circuit.

5. The protective monitoring circuit as claimed in claim 1, wherein the secondary-battery monitoring circuit calculates in advance gain and offset factors of the output voltage of the secondary battery that is in linear relationship with the generated voltage, and uses the calculated gain and offset factors to generate the detection value from the generated voltage.

6. A battery pack, comprising:
    a secondary battery; and
    a protective monitoring circuit, wherein the protective monitoring circuit includes:
a protective circuit to detect at least one of overcharging, overdischarging, and overcurrent of a chargeable secondary battery to control whether to turn on or off a control transistor to protect the secondary battery; and
a secondary-battery monitoring circuit to detect a status of the secondary battery,
wherein the protective circuit generates a voltage that is commensurate with an output voltage of the secondary battery and that is within a predetermined tolerance voltage range of the secondary-battery monitoring circuit, and the secondary-battery monitoring circuit generates a detection value responsive to the generated voltage supplied from the protective circuit, the detection value being indicative of the output voltage of the secondary battery, and
wherein the voltage generated by the protective circuit and supplied to the secondary-battery monitoring circuit is an electrical voltage commensurate with and lower than the output voltage of the secondary battery.

* * * * *